United States Patent
Arai et al.

(10) Patent No.: US 7,870,237 B2
(45) Date of Patent: Jan. 11, 2011

(54) NETWORK CONFIGURATION RESTORATION METHOD AND SYSTEM

(75) Inventors: Daisuke Arai, Saitama (JP); Kiyohito Yoshihara, Saitama (JP); Akira Idoue, Saitama (JP); Hiroki Horiuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 200 days.

(21) Appl. No.: 12/167,499

(22) Filed: Jul. 3, 2008

(65) Prior Publication Data

US 2009/0012966 A1    Jan. 8, 2009

(30) Foreign Application Priority Data

Jul. 3, 2007    (JP) .............................. 2007-175670

(51) Int. Cl.
*G06F 15/16* (2006.01)
(52) U.S. Cl. ...................................... 709/221
(58) Field of Classification Search ................. 709/221, 709/220
See application file for complete search history.

(56) References Cited

U.S. PATENT DOCUMENTS

2003/0233431 A1 * 12/2003 Reddy et al. ................. 709/221

FOREIGN PATENT DOCUMENTS

JP    2008071119    3/2008

OTHER PUBLICATIONS

Kiyohito Yoshihara et al., "Proposal on Dependable Network Management System Enabling Fast Recovery from Operational Errors", Proceedings of the IEICE General Conference, B-7-223, vol. 2007, No. 2 (Mar. 7, 2007), p. 313 with an English translation.

Daisuke Arai et al., "Implementation of Dependable Network Management System Enabling Fast Recovery from Operational Errors", Proceedings of the IEICE General Conference, B-7-224, vol. 2007, No. 2 (Mar. 7, 2007), p. 314 with an English Translation.

* cited by examiner

*Primary Examiner*—Wing F Chan
*Assistant Examiner*—Andrew Woo
(74) *Attorney, Agent, or Firm*—Westman, Champlin & Kelly P.A.

(57) ABSTRACT

The present invention provides a network configuration restoration method and system which can perform restoration by copying past configuration files in a short time. An updating judging unit 304 judges updating of each network device by comparing an acquired configuration file and a registered configuration file linked to a first identifier representing a copy timing. A new save unit 312 acquires an updated configuration file from a network device, and links the updated configuration file to a first identifier and a second identifier which sets the current timing as a new save timing and saves it in a configuration file database 301. A save unit 311 copies a registered configuration file of a network device whose configuration file has not been updated and links it to a first identifier representing the copy timing and a second identifier linked to this configuration file and saves it.

4 Claims, 11 Drawing Sheets

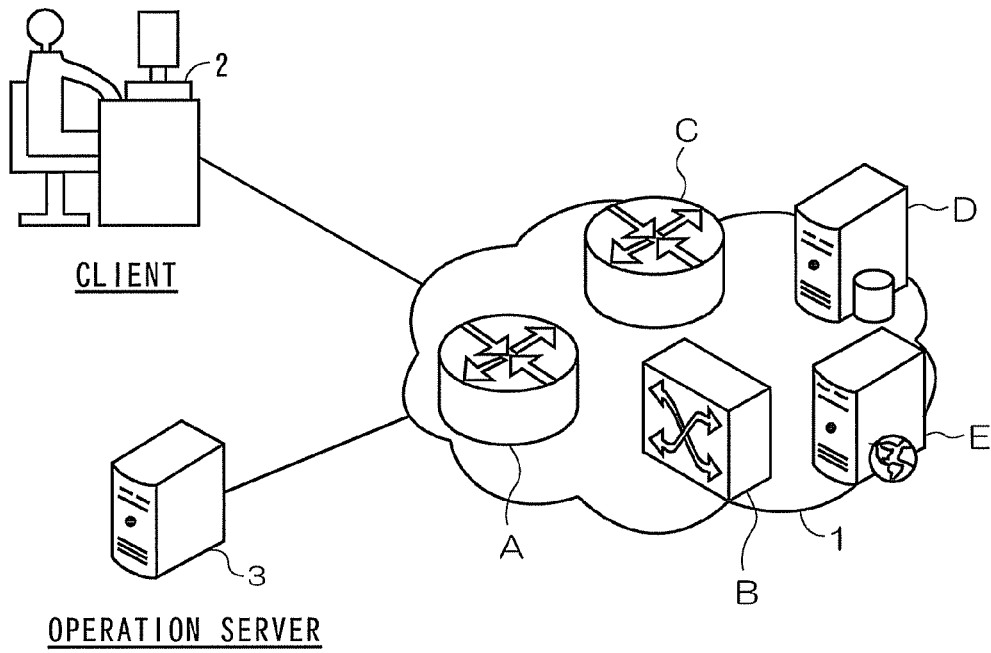

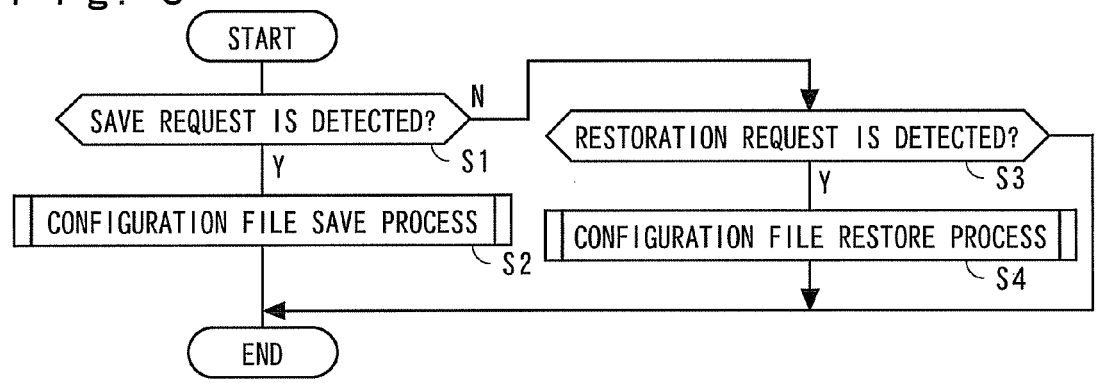
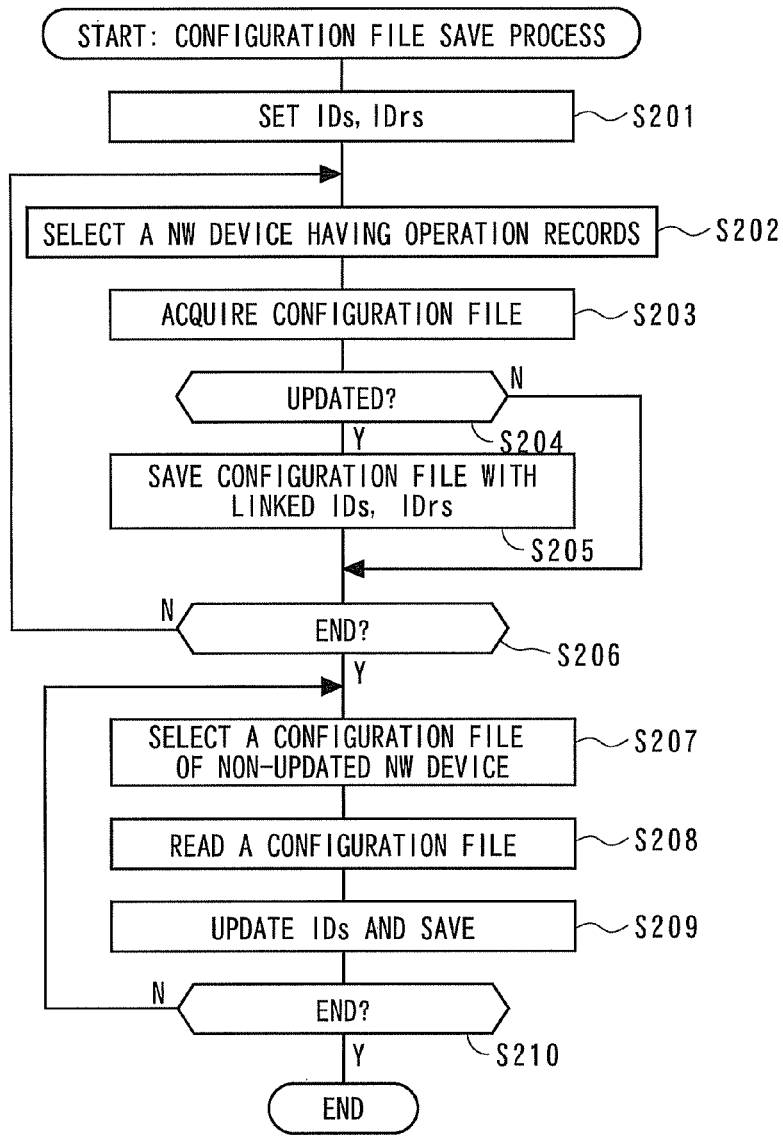

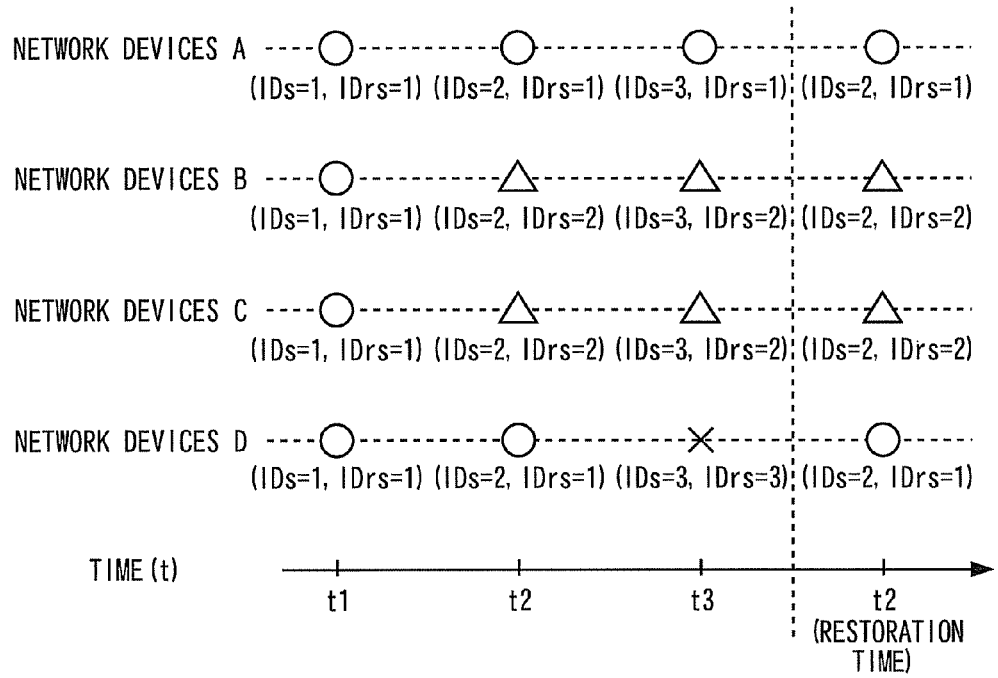
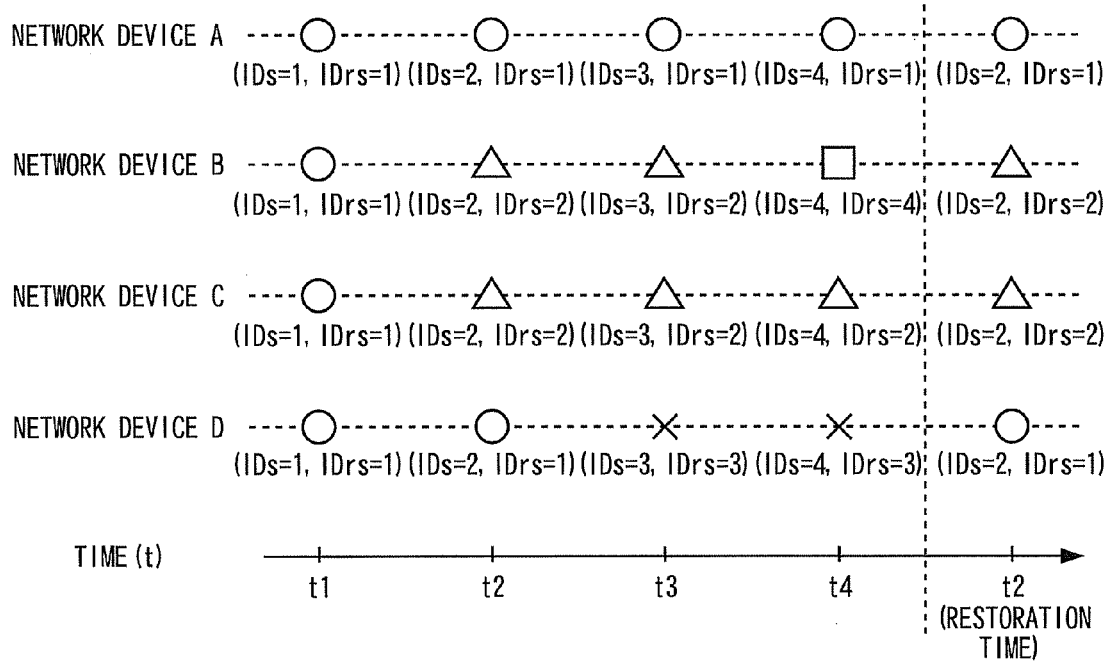

Fig. 9

```
!
interface FastEthernet0
 description $ES_WAN$$FW_OUTSIDE$
 ip address 192.168.1.21 255.255.255.0
 no ip redirects
 no ip unreachables
 no ip proxy-arp
 ip nat outside
 ip virtual-reassembly
ip route-cache flow
 duplex auto
 speed auto
!
interface FastEthernet1
 no ip address
 no ip redirects
 no ip unreachables
 no ip proxy-arp
 ip route-cache flow
 shutdown
 duplex auto
 speed auto
!
interface BRI0
 no ip address
 no ip redirects
 no ip unreachables
 no ip proxy-arp

OMISSION ip address 192.168.0.1 255.255.255.0
 no ip redirects
 no ip unreachables
 no ip proxy-arp
 ip nat inside
 ip virtual-reassembly
 ip route-cache flow
 ip tcp adjust-mss 1452
!
ip route 0.0.0.0 0.0.0.0 192.168.1.1
ip route 192.168.2.0 255.255.255.0 192.168.0.8
ip route 192.168.3.0 255.255.255.0 192.168.0.8
!
```

- First FastEthernet0 block: ITEM
- FastEthernet1 block: ITEM
- ip route block: ITEM "STATIC ROUTE"

Fig. 13

```
!
ip route 0.0.0.0 0.0.0.0 192.168.1.1
ip route 192.168.2.0 255.255.255.0 192.168.0.8
!
```
CURRENT CONFIGURATION FILE

⇩ RESTORATION

```
!
ip route 0.0.0.0 0.0.0.0 192.168.1.1
ip route 192.168.2.0 255.255.255.0 192.168.0.8
ip route 192.168.3.0 255.255.255.0 192.168.0.8
!
```
TARGET CONFIGURATION FILE

Fig. 14

```
!
ip route 0.0.0.0 0.0.0.0 192.168.1.1
ip route 192.168.2.0 255.255.255.0 192.168.0.8
ip route 192.168.3.0 255.255.255.0 192.168.0.8
!
```
CURRENT CONFIGURATION FILE

⇩ RESTORATION

```
!
ip route 192.168.2.0 255.255.255.0 192.168.0.8
ip route 192.168.3.0 255.255.255.0 192.168.0.8
!
```
TARGET CONFIGURATION FILE

Fig. 15

```
!
ip route 0.0.0.0 0.0.0.0 192.168.1.1
ip route 192.168.2.0 255.255.255.0 192.168.0.8
ip route 192.168.3.0 255.255.255.0 192.168.0.8
!
```
CURRENT CONFIGURATION FILE

⇩ RESTORATION

```
!
ip route 0.0.0.0 0.0.0.0 192.168.1.1
ip route 192.168.2.0 255.255.255.0 192.168.0.8
ip route 192.168.5.0 255.255.255.0 192.168.0.8
!
```
TARGET CONFIGURATION FILE

NETWORK CONFIGURATION RESTORATION METHOD AND SYSTEM

The present application is claims priority of Japanese Patent Application Serial No. 2007-175670, filed Jul. 3, 2007, the content of which is hereby incorporated by reference in its entirety.

BACKGROUND OF THE INVENTION

1. Field of the Invention

The present invention relates to a network configuration restoration method and a system for restoring configurations of network devices to states before changing, more specifically, to a network configuration restoration method and a system which enable restoration in a short time.

2. Description of the Related Art

Systems in which a next-generation NW operation server which manages network configuration files (hereinafter, may be expressed as configuration files, simply) of network devices is installed on a network NW, and when a failure such as an operation mistake occurs, past configuration files are collectively readout from this next-generation NW operation server and reconfigured in each network device in order to back-up quick restoration are disclosed in Non-patent documents 1 and 2 and Patent document 1. Conventional restoration of network configuration files is executed according to the following steps.

Step 1: An operator performs operations (including configuration) of various network devices such as a router, switch, and server, etc., by using a client terminal. At this time, the NW operation server collects operation logs. In addition, the server saves and manages configuration files of all network devices when the operations are finished.

Step 2: When the operation contents include an error or the like, a warning or failure is notified.

Step 3: The operator operates the next-generation NW operation server via the client terminal to restore configuration files of all managed devices to past states (at an arbitrary time when the devices are normally operated). Accordingly, the network devices can be restored from the failure.

Step 4: After restoration from the failure, the operator analyzes operation logs that the next-generation NW operation server saves and manages, and identifies a cause of the failure.

[Non-patent document 1] Kiyohito Yoshihara et al., "Proposal of dependable network management system enabling quick restoration from operation mistake," IEICE General Conference 2007 Collected Papers

[Non-patent document 2] Daisuke Arai et al., "Implementation of dependable network management system enabling quick restoration from operation mistake," IEICE General Conference 2007 Collected Papers

[Patent document 1] Japanese Patent Application No. 2006-249299

The above-described conventional techniques have the following problems.

(1) It is necessary that configuration files are collected from all network devices as managed devices for every operation, and in the case of restoration, configuration files of all network devices are reconfigured, so that the time required for collection and restoration of configuration files increases according to an increase in the number of managed devices.

(2) When executing restoration by copying past configuration files, some network devices (for example, routers and switches made by Cisco) require restart of it after network configuration, and the time for this occupies most of the restoration.

SUMMARY OF THE INVENTION

An object of the present invention is to provide a network configuration restoration method and system which can perform restoration by copying past configuration files in a short time.

The present invention includes the following means in a network configuration restoration system which saves configuration files of network devices in an operation server in response to a save request and reconfigures registered configuration files designated by a restoration request issued subsequently into each network device to restore network configurations.

(1) An operation server includes a storage means for saving a configuration file by linking it to a second identifier representing a new save timing of the configuration file to the operation server and a second identifier representing a copy timing of the configuration file in the operation server; an operation record monitoring means for monitoring operation records of the network devices; a configuration file acquiring means for acquiring a configuration file from a network device which has an operation record after the latest save timing in response to a save request; an updating judgment means for judging updating of each network device by comparing the acquired configuration file and a registered configuration file linked to a first identifier representing the latest save timing; a new save means for saving the configuration file acquired from a network device whose configuration file has been updated by linking it to a first identifier and a second identifier representing a current save timing; and a save means for copying a registered configuration file linked to a first identifier representing the latest save timing of a network device whose configuration file has not been updated and registering it by linking it to a first identifier representing a current save timing and a second identifier linked to this configuration file into the storage means.

(2) The operation server further includes an object-to-be-restored identifying means for identifying an network device to be restored in response to a restoration request including a restoration timing; and a configuration file restoring means for reconfiguring a registered configuration file linked to a first identifier representing the restoration timing into the network device to be restored, wherein the object-to-be-restored identifying means includes a first readout means for reading out a second identifier of a registered configuration file linked to a first identifier representing the latest save timing, a first readout means for reading out a second identifier of a registered configuration file linked to the first identifier representing the restoration timing, and a comparing means for comparing second identifiers of the network devices with each other, and identifies a network device to be restored based on a comparison result.

(3) Among the network devices, in a network device in which a configuration file stored in a nonvolatile storage region is copied into a volatile storage region and executed, when the network device starts, the configuration file restoring means includes a change analyzing means for analyzing a changed item and details of the change by comparing a registered configuration file linked to a first identifier representing the latest save timing and a registered configuration file linked to a first identifier representing a restoration timing, a first command generating means for generating a command for adding a deleted item whose content of change is "deletion" to the configuration file in the volatile storage region, a second command generating means for generating a command for deleting an added item whose content of change is "addition" from the configuration file in the volatile storage region, a third command generating means for generating a command for deleting a changed item whose content of change is "change" from the configuration file in the volatile storage region and a command for adding the item before changing to the configuration file in the volatile storage region, a command transmitting means for transmitting the commands to a corresponding network device and making it execute the commands, and a means for instructing each network device to copy a configuration file restored in the volatile storage region into the nonvolatile storage region.

According to the present invention, the following effects are realized.

According to the feature (1) described above, only a configuration file whose contents are possibly updated is acquired from each network device by the operation server, and regarding a configuration file whose contents have not been updated, a registered configuration file acquired in the past by the operation server is readout and saved again as a configuration file corresponding to a current save time, so that the quantity of configuration files which the operation server acquires from the respective network devices can be reduced.

According to the feature (2) described above, configuration files to be restored and current configuration files of the network devices are compared and only a configuration file whose contents have been updated is restored, so that the time and the amount of traffic required for restoration can be reduced.

According to the feature (3) described above, in a network device in which a configuration file stored in a nonvolatile storage region is copied into a volatile storage region and executed when starting, the configuration file copied into the volatile storage region is restored to the configuration at the restoration timing, so that the configuration file can be made valid even after restoration without restarting the network device.

BRIEF DESCRIPTION OF THE DRAWINGS

FIG. 1 is a view showing a typical assumed environment of a network to which a network configuration restoration method of the present invention is applied;

FIG. 2 is a view schematically expressing a condition where configuration files of network devices are saved by being linked to a first identifier IDs and a second identifier IDrs=1;

FIG. 3 is a flowchart showing operations of an operation server 3;

FIG. 4 is a flowchart showing steps of configuration file save processing;

FIG. 5 is a view (No. 1) schematically expressing a condition where configuration files of the network devices are restored based on the first identifier IDs and the second identifier IDrs=1;

FIG. 6 is a view (No. 2) schematically expressing a condition where configuration files of network devices are restored based on the first identifier IDs and the second identifier IDrs=1;

FIG. 9 is a view showing an example of a configuration file of a router made by Cisco;

FIG. 13 is a view (No. 1) describing contents of commands;

FIG. 14 is a view (No. 2) describing contents of commands;

FIG. 15 is a view (No. 3) describing contents of commands;

DETAILED DESCRIPTION OF THE PREFERRED EMBODIMENTS

Figure 7:
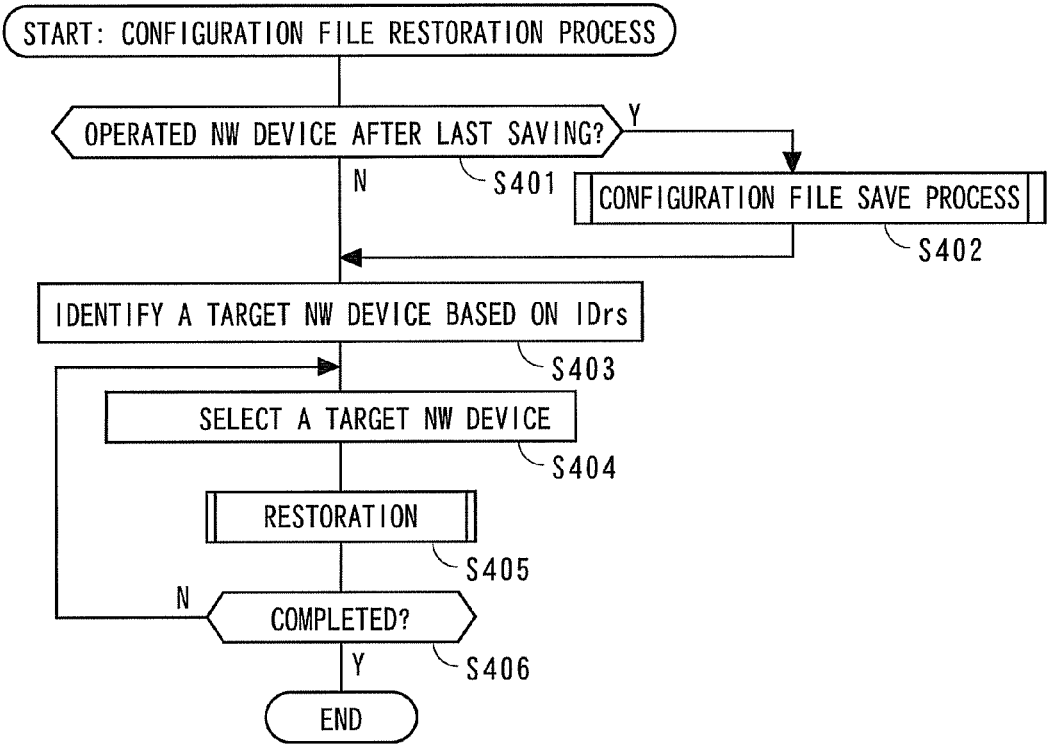
FIG. 7 is a flowchart showing steps of configuration file restoration processing.

FIG. 1 is a view showing a typical assumed environment of a network to which a network configuration restoration method of the present invention is applied.

A network (NW) 1 to be managed includes various network devices A, B, C, D and so on such as switches, routers, and servers, etc., whose network configuration files are to be restored. To this NW 1, a client 2 which sets a network configuration into each network device and an operation server 3 which acquires a network configuration file from each network device in response to a save request from the client 2 and further restores the network configuration by reconfiguring the registered configuration file into each network device in response to a restoration request from the client 2, are connected.

FIG. 2 is a view schematically expressing a condition where configuration files of the four network devices A, B, C, and D are updated according to operations by the client 1 and the updated configuration files are linked to two identifiers IDs and IDrs and saved in the operation server 3.

In the present invention, in response to each save request, configuration files of all network devices are linked to identifiers representing the save time and accumulated in the operation server 3. In the present invention, to avoid wasteful repetition of acquiring not-updated configuration files from the network devices for each save request, only configuration files which are possibly updated are acquired from the network devices, and regarding a not-updated configuration file, a configuration file which has already been registered in the operation server 3 is readout and copied.

Therefore, in the present invention, a first identifier IDs representing a time when the configuration file was copied in the operation server and a second identifier second identifier IDrs representing a time when the configuration files was newly saved are defined, and these identifiers IDs and IDrs are linked to each configuration file. Therefore, for a configuration file which was acquired from the network device and newly saved, the values of the first identifier IDs and the second identifier IDrs are equal to each other.

In FIG. 2, at the time t1, configuration files Fa, Fb, Fc, and Fd of all network devices A, B, C, and D are linked to the first identifier IDs and a second identifier and registered in advance in the operation server 3. When the time t1 is the new save timing, "1" representing the time t1 is registered on both the first identifier IDs and the second identifier IDrs.

FIG. 3 and FIG. 4 are flowcharts showing operations of the operation server 3, and after the time t1 of FIG. 2, when only the configuration files Fb and Fc of two network devices B and C are updated and a save request for these configuration files is notified to the operation server 3 from the client 1, this is detected at Step S1 of FIG. 3 and the process advances to Step S2. At Step S2, configuration file save processing is executed.

FIG. 4 is a flowchart showing steps of the configuration file save processing. At Step S201, a first identifier IDs=2 and a second identifier IDrs=2 representing the time t2 are set. At Step S202, one of the network (NW) devices which has an operation record after the previous save time t1 is selected. In this embodiment, description will be continued on the assumption that three network devices B, C, and D have operation records and the network device B is selected first.

At Step S203, the configuration file Fb of the network device B is acquired by the operation server 3. At Step S204, from a group of registered configuration files linked to the first identifier IDs=1 representing the last save time t1, the configuration file Fb of the network device B is read. Then, this configuration file Fb (IDs=1) and the current configuration file Fb acquired at the time t2 are compared with each other, and based on whether these match each other, it is judged whether the configuration file has been updated. When they do not match each other, it is judged that the file has been updated and the process advances to Step S205, and the current configuration file Fb acquired at the Step S203 is linked to the first identifier IDs=2 and the second identifier IDrs=2 representing the time t2 and saved.

At Step S206, it is judged whether the above-described processings have been completed for all network devices having operation records. Herein, the processings have not been performed for the network devices C and D, so that the process returns to Step S202 and the processings are repeated. Regarding the network device C, similar to the network device B, it is judged that the configuration file thereof has been updated, so that the configuration file Fc acquired from the network device C at Step S203 is linked to the first identifier IDs=2 and the second identifier IDrs=2 representing the time t2 and saved.

On the other hand, regarding the network device D, for example, only an operation record showing reference of the file is preserved, so that it is judged at Step S204 that the configuration file has not been updated and the process advances to Step S206.

At Step S207, one of network devices whose configuration files have not been updated is selected. In the present embodiment, two network devices A and D are selected in order. At Step S208, regarding the selected network device, from a group of registered configuration files linked to the first identifier IDs=1 representing the previous save time t1, a configuration file of the non-updated network device is read together with the first identifier IDs and second identifier IDrs. At Step S209, only the first identifier IDs is rewritten into "2" representing the current save time t2, and the configuration file is saved as one of the group of the configuration files corresponding to the first identifier IDs=2.

In the case of the network device A, a configuration file whose contents are the same as those of the registered configuration file Fa (IDs=1, IDrs=1) linked to the first identifier IDs=1 and the second identifier IDrs=1 is linked to the first identifier IDs=2 representing the current save time t2 and the second identifier IDrs=1 and saved.

At Step S210, it is judged whether the processings have been completed for all network devices whose configuration files have not been updated, and until the processings are completed for all the network devices, the process returns to Step S207 and repeats the processings.

Returning to FIG. 2, when a save request is detected at the time t2 as described above, the configuration files Fb and Fc of the two network devices B and C are linked to the first identifier IDs=2 and the second identifier IDrs=2 representing the save time t2 and saved in the operation server 3.

On the other hand, configuration files Fa and Fd of the remaining network devices A and D whose configuration files have not been updated are linked to the first identifier IDs=2 representing the current save time t2 and the second identifier IDrs=1 representing the time t1 when these configuration files were newly saved.

Further, when only the configuration file Fd of the network device D is updated after the time t2 and a new save request is detected at the time t3, the configuration file Fd of this network device D is linked to a first identifier IDs=3 and a second identifier IDrs=3 representing the current save time t3 and registered in the operation server 3.

On the other hand, among the configuration files Fa, Fb, and Fc of the remaining network devices A, B, and C whose configuration files have not been updated, the configuration file Fa of the network device A the contents of which are the same as those newly saved at the time t1 is linked to the first identifier IDs=3 representing the current save time t3 and the second identifier IDrs=1 representing the time t1 and registered in the operation server 3.

Similarly, configuration files Fb and Fc of the network devices B and C the contents of which are the same as those newly saved at the time t2 are linked to the first identifier IDs=3 representing the current save time t3 and the second identifier IDrs=2 representing the time t2 and registered in the operation server 3.

Next, steps for restoring the configuration files of the network devices to configuration contents at a desired restoration time by using the configuration files thus saved in time series will be described. Herein, description will be given on the assumption that the configuration files of the respective network devices are updated through the progress of FIG. 5 and the latest save timing is the time t3 by way of example.

An operator transmits a restoration request including a desired restoration time to the operation server 3 from the client 1, and when this is detected at Step S3 of FIG. 3, the process advances to Step S4 and executes configuration file restoration processing. Herein, the description will be continued on the assumption that t2 is designated as the restoration time.

Figure 8:
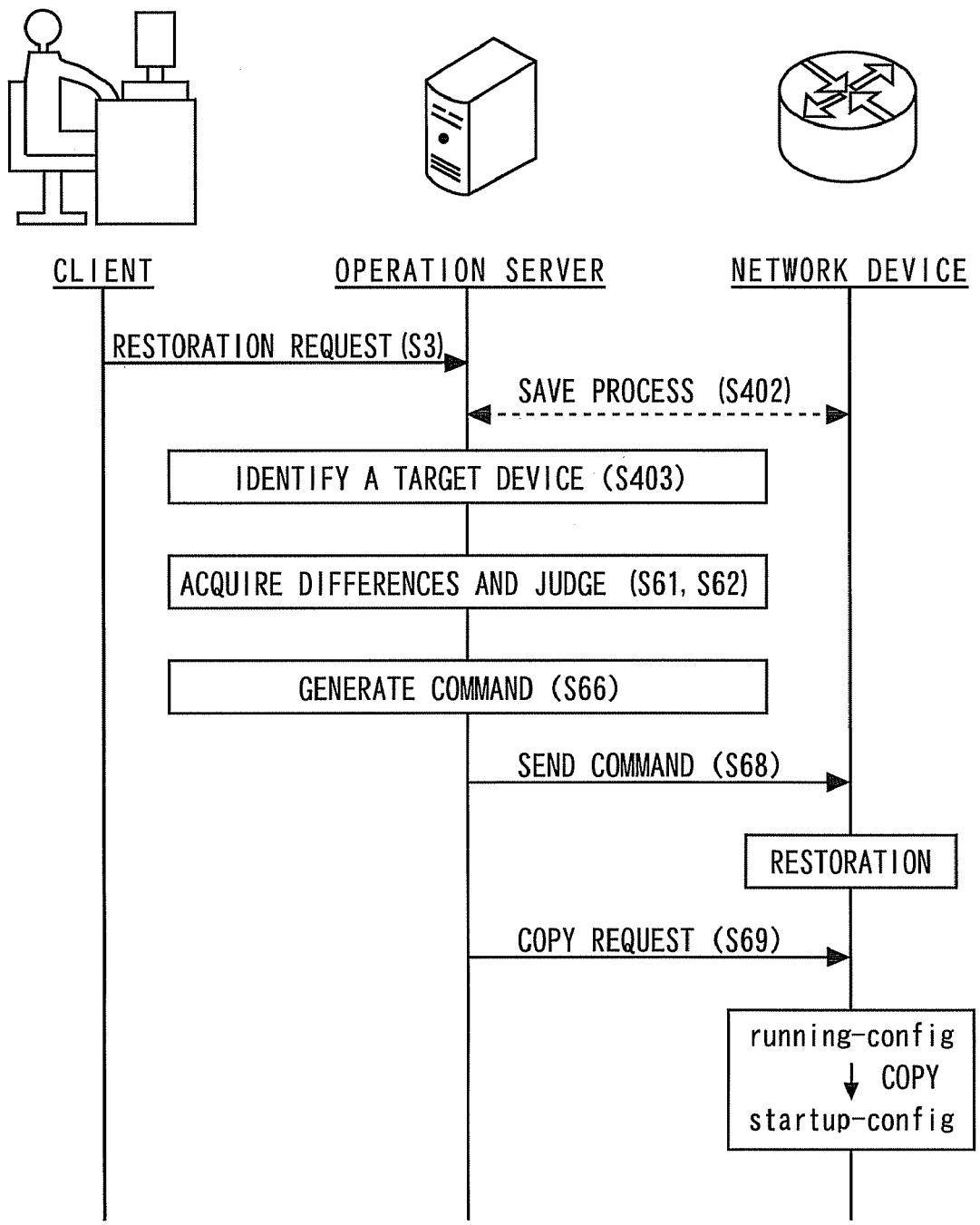
FIG. 8 is a sequence flow showing steps of configuration file restoration processing.

FIG. 7 is a flowchart showing steps of the configuration file restoration processing, and FIG. 8 shows a sequence flow thereof.

At Step S401, it is judged whether any network device was newly operated after the latest save time t3. When no network device was operated, the process advances to Step S403, and when such a network device is found, the process advances to Step S402. At Step S402, processing similar to the configuration file save processing described in the flowchart of FIG. 4 is executed, and a time t4 when this restoration request is received is set as a save time and the configuration file is saved in the operation server 3 in the same manner as described above, and thereafter, the process advances to Step S403.

FIG. 6 is a view showing updating states of the configuration files of the network devices when network configuration save processing was newly executed at the time t4, and herein, the network device B was operated after the time t3, so that the configuration file Fb of the network device B is loaded and linked to a first identifier IDs=4 and a second identifier IDrs=4 representing the save time t4 and newly saved in the operation server 3.

Regarding other network devices A, C, and D which have not been updated, configuration files linked to the first identifier IDs=3 representing the last save time t3 are readout and saved after only the first identifier IDs is rewritten into a first identifier IDs=4 representing the current save time t4.

At Step S403, the second identifiers IDrs of the configuration files linked to the first identifier IDs=3 representing the latest (last) save time (time t3 in the example of FIG. 5) and the second identifiers IDrs of the configuration files linked to the first identifier IDs=2 representing the restoration time t2 are compared with each other, and based on the results of this comparison, a network device to be restored is identified. In other words, a network device that does not match the second identifier IDrs is set as an object to be restored.

Referring to FIG. 5, the second identifier IDrs of the configuration file Fa saved at the time t3 of the network device A and the second identifier IDrs of the configuration file saved at the restoration time t2 are both "1" and it is known that the configuration files of the times t2 and t3 are identical to each other, so that the network device is not set as an object to be restored.

Similarly, regarding the network device B and C, the second identifiers IDrs at the time t3 and the second identifiers IDrs at the restoration time t2 of the configuration files Fb and Fc are both "2" and it is known that the configuration files at the times t2 and t3 are identical to each other, so that the network devices B and C are not set as objects to be restored, either.

On the other hand, regarding the network device D, the second identifier IDrs at the restoration time t2 of the configuration file Fd is "1," and on the other hand, the second identifier IDrs at the latest save time t3 is "3," so that it is known that the configuration files at the times t2 and t3 are different from each other, so that the network device D is set as an object to be restored.

In the example shown in FIG. 6, the network devices A and C are not set as objects to be restored, and the network devices B and D are set as objects to be restored.

Returning to the flowchart of FIG. 7, at Step S404, one network device to be restored is selected. At Step S405, for this network device, network configuration restoration processing which will be described in detail later is executed. At Step S406, it is judged whether restoration processing has been completed for all objects to be restored, and until it is completed, the process returns to Step S404 and repeats the above-described steps.

Next, a network configuration restoration method to be executed at the step S405 will be described.

In the present embodiment, the restoration steps differ depending on whether the network device copies a configuration file stored in a nonvolatile storage region into a volatile storage region and executes it when starting as in the case of a router or switch made by Cisco. In a device which copies a configuration file stored in a nonvolatile storage region into a volatile storage region and executes it when starting, restoration processing using the commands described in detail later is executed, and in other devices, the same restoration steps as in the conventional technique are executed.

FIG. 9 is a view showing an example of a configuration file of a router made by Cisco, and the configuration file is a set of "items" sandwiched between two "!" marks, and an "item value" is registered in each "item." Herein, description is given by focusing on three item values "ip route 0.0.0.0 0.0.0.0 192.168.1.1," "ip route 192.168.2.0 255.255.255.0 192.168.0.8, and "ip route 192.168.3.0 255.255.255.0 192.168.0.8" registered in the item "static route." In the present invention, either of the following two restoration methods is employed to execute restoration.

[First Restoration Method]

The router made by Cisco includes a nonvolatile storage region "startup-config" and a volatile storage region "running config" as storage regions of a configuration file, and when the router starts, the contents of "startup-config" are copied into "running-config," and thereafter, the router operates according to the configuration file registered in the "running-config." Therefore, by writing the configuration file at the restoration time onto "startup-config" and then restarting the router, the configuration file is copied into the "running-config" and the router can be restored.

[Second Restoration Method]

The above-described first restoration method requires restart of the router, however, if the restoring target configuration file can be directly copied not into the "startup-config" but into the "running-config," restarting of the router can be omitted. However, like the router made by Cisco, when a copy command into "running-config" involves merging (coupling), the contents of the restoring target configuration file and the restored contents in the "running-config" may be inconsistent with each other.

Figure 10:
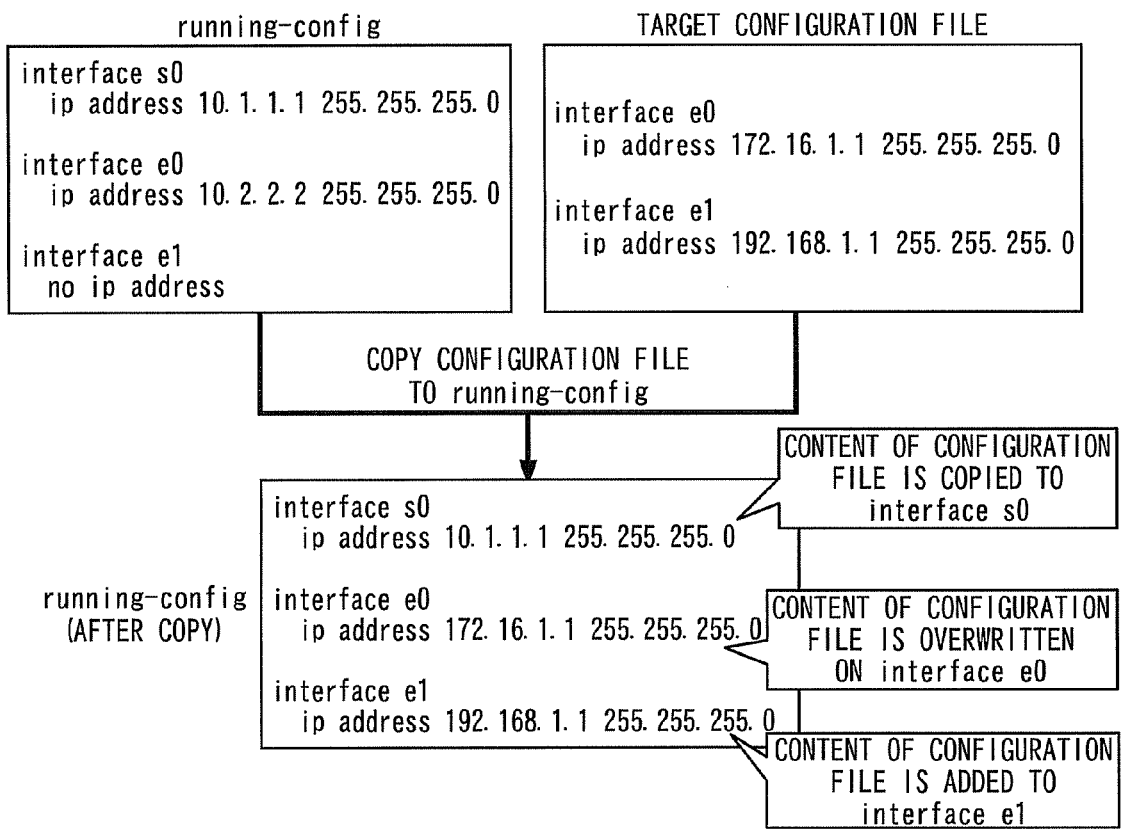
FIG. 10 is a view showing a condition where an inconsistency occurs when a configuration file is restored by merging.

FIG. 10 is a view describing an inconsistency which may occur when a restoring target configuration file is merged in the "running-config" of the network device, and when restoration from a current configuration file registered in the "running-config" to the restoring target configuration file is only addition and change of item values, inconsistency does not occur even by merging the restoring target configuration file into the current configuration file. However, when the restoration includes deletion of an item value, the existing unnecessary item value cannot be deleted by merging, so that an inconsistency occurs.

Therefore, according to the second restoration method, a current configuration file and a restoring target configuration file are compared and a difference between these is obtained in advance, and when restoration without an inconsistency is possible by only merging, the configuration file is directly copied into "running-config," and on the other hand, when an inconsistency occurs by merging, a command for rewriting the "running-config" is generated in the operation server 3 and transmitted to the network device to rewrite the "running-config."

Figure 11:
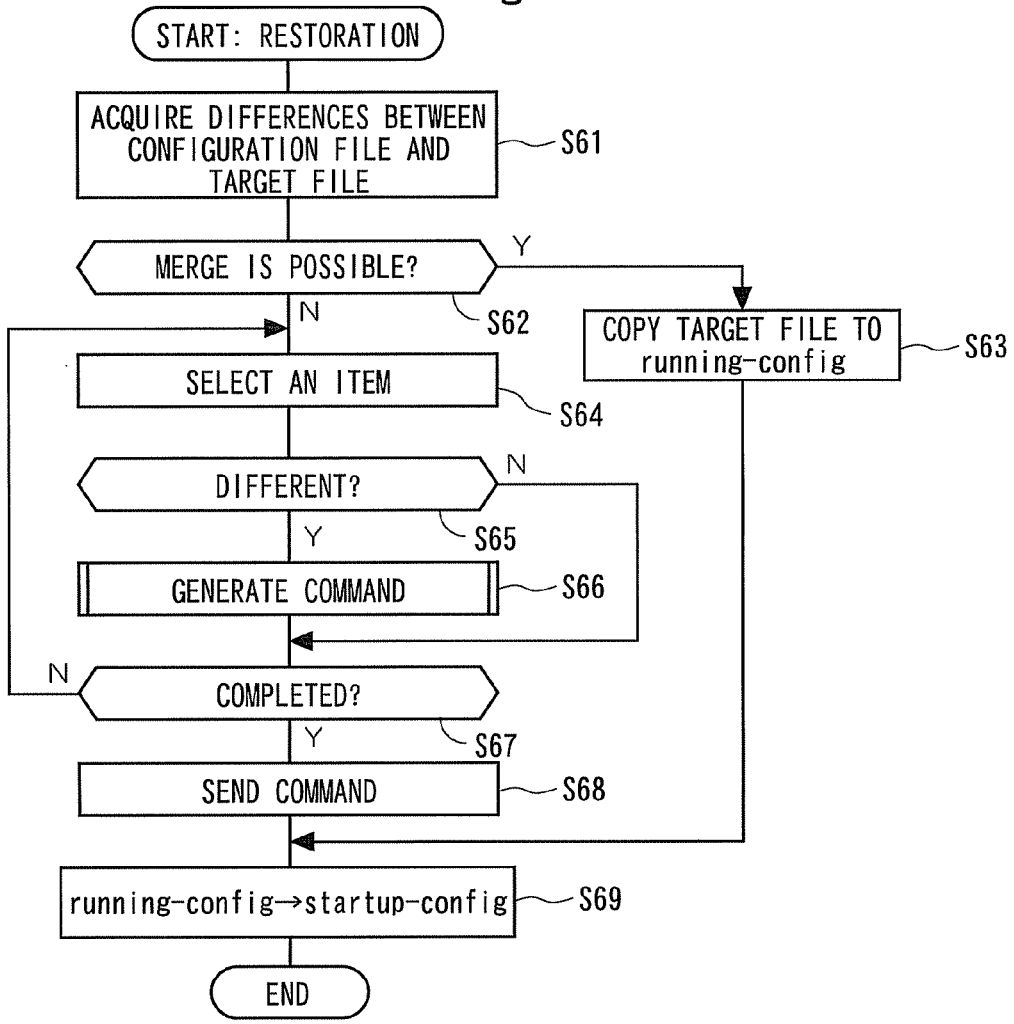
FIG. 11 is a flowchart showing steps of a second restoration method.

Hereinafter, the second restoration method will be described in detail with reference to the flowchart of FIG. 11.

At Step S61, a difference between the latest configuration file and a restoring target configuration file is acquired for each configuration item. At Step S62, it is judged whether restoration by merging is possible based on the difference. When restoration by merging is possible, the process advances to Step S63, and the restoring target configuration file is copied (merged) into the "running-config" of the router.

On the other hand, when restoration by merging is not possible, the process advances to Step S64, and one of the items is selected. At Step S65, regarding the selected item, differences between the item values of the latest configuration file and the item values of the restoring target configuration file are referred to, and when they have differences, the process advances to Step S66, and a command for restoring the differences is generated.

Figure 12:
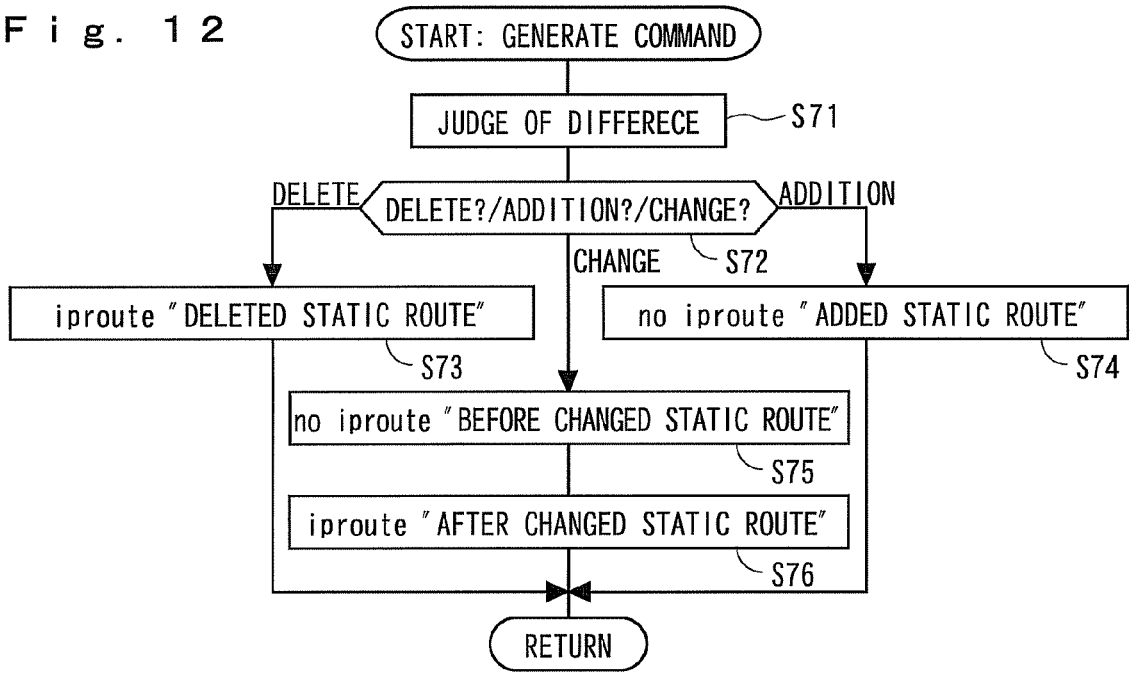
FIG. 12 is a flowchart showing steps of command generation.

FIG. 12 is a flowchart showing steps of the command generation, and herein, a command for restoring the item "static route" will be described by way of example.

At Step S71, the differences are analyzed for each item value. At Step S72, based on the results of analysis, it is judged which of "deletion," "addition," and "change" the updating from the restoring target configuration file to the current configuration file corresponds to.

As shown in FIG. 13, when the current configuration file contains deletion of a part of the item value (herein, "ip route 192.168.3.0 255.255.255.0 192.168.0.8") from the restoring target configuration file, this is judged as "deletion" and the process advances to Step S73, and a command "ip route 192.168.3.0 255.255.255.0 192.168.0.8" for adding this item value to the configuration file is generated.

As shown in FIG. 14, when the current configuration file contains addition of a part of the item value (herein, "ip route 0.0.0.0 0.0.0.0 192.168.1.1") to the restoring target configuration file, this is judged as "addition" and the process advances to Step S74, and a command "no iproute 0.0.0.0 0.0.0.0 192.168.1.1" for deleting this item value from the configuration file is generated.

Further, as shown in FIG. 15, when the current configuration file contains change of a part of the item value of the restoring target configuration file (herein, "ip route 192.168.5.0 255.255.255.0 192.168.0.8" is changed to "ip route 192.168.3.0 255.255.255.0 192.168.0.8"), this is judged as "change" and the process advances to Step S75, and a command "no iproute 192.168.3.0 255.255.255.0 192.168.0.8" for deleting the changed (current) item value from the configuration file is generated. At Step S76, a command "ip route 192.168.5.0 255.255.255.0 192.168.0.8" for adding the item value before changing to the configuration file is generated.

Returning to FIG. 11, at Step S67, it is judged whether command generation has been completed for all items, and until it is completed, the process returns to Step S64 and repeats the above-described processings. At Step S68, the command generated at the Step S66 is transmitted to a corresponding network device. Each network device executes a received command and restores "running-config." At Step S69, a request for copying the "running-config" to "startup-config" is transmitted to the network devices. Each network device copies the contents of the "running-config" into the "startup-config" in response to this request.

Figure 16:
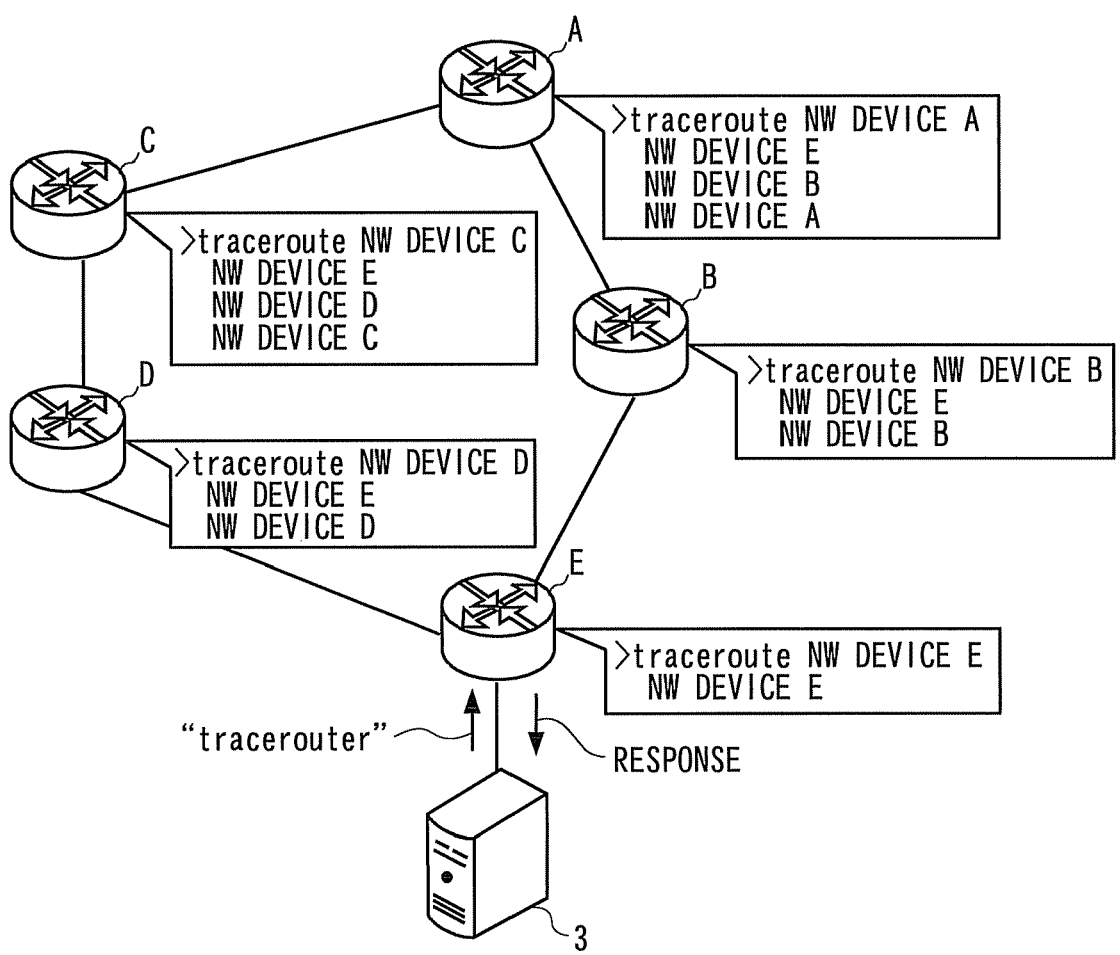
FIG. 16 is a view describing a determination method for a restoration order for routers.

Next, with reference to the flowcharts of FIG. 16 and FIG. 17, a restoration order determination method for network devices (herein, routers or switches) will be described. In the present embodiment, the operation server 3 executes traceroute for investigating a route as background processing and transmits an ICMP echo request message to the routers, and based on ICMP Time Exceeded error messages sent back, judges distances (number of hops) to the respective routers, and restores network configurations of the routers in descending order of the number of hops.

Figure 17:
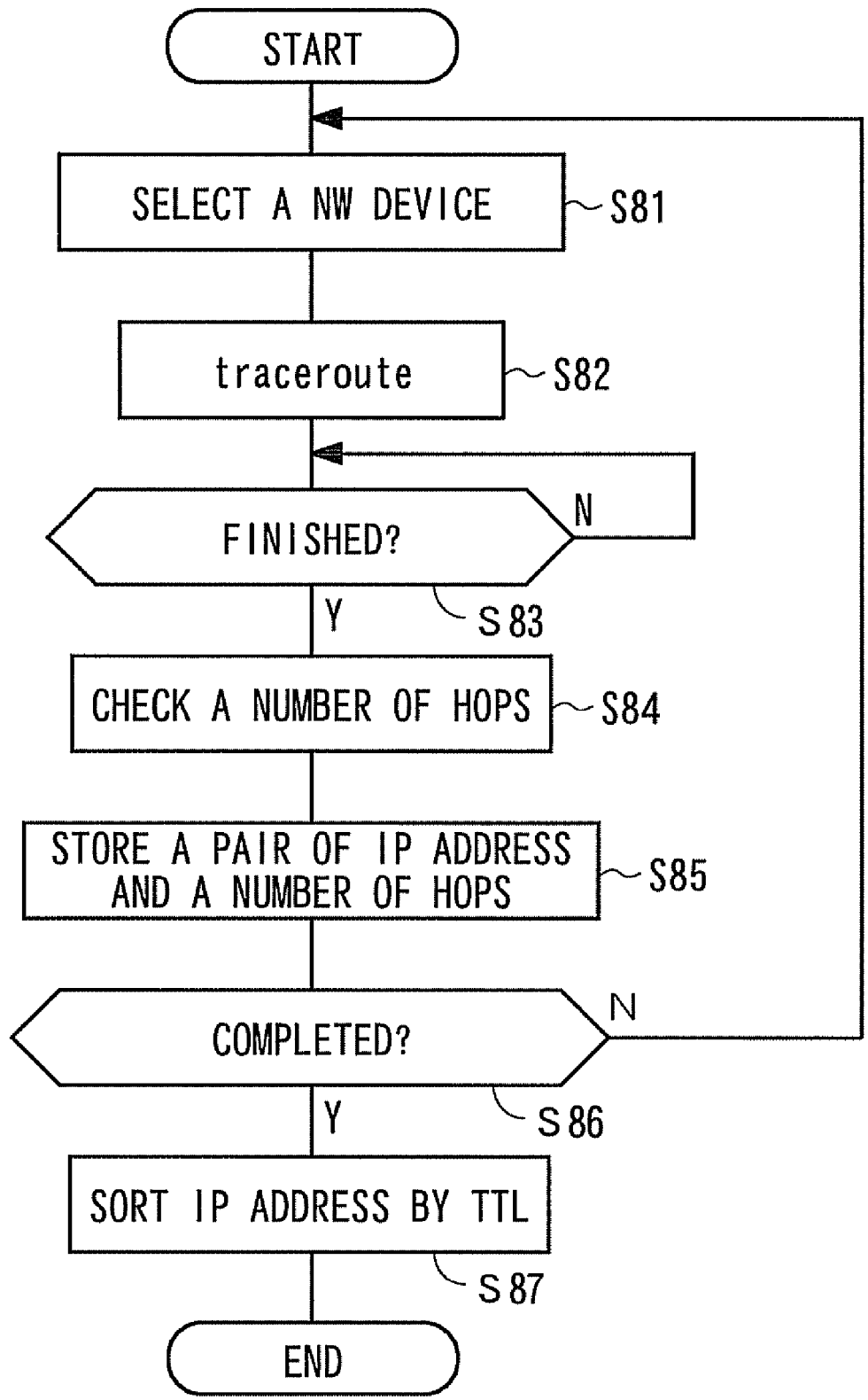
FIG. 17 is a flowchart showing the restoration order for routers.

FIG. 17 is a flowchart showing steps of the restoration order determination method for routers by the operation server 3, and at Step S81, one of the network devices is selected as the device to be focused on this time. At Step S82, traceroute is executed for the device being focused on this time, and an ICMP echo request message addressed to the device of focus is sequentially transmitted while updating the value in the TTL (Time To Live) field.

Each router which received this ICMP echo request message on the route decrements the value in the TTL field by "1," and when the result is other than "0," it transfers this message to the next hop based on route information of the router itself. When the result of decrementing the value in the TTL field by "1" is "0," this message is discarded and an ICMP Time Exceeded error message including the device's own IP address registered in a source IP address field is sent back to the operation server 3.

At Step S83, based on whether the response message could be received from the device being focused on this time, it is judged whether the traceroute for the device being focused on this timehas been completed. When the traceroute is completed, the process advances to Step S84 and the number of hops to the device being focused on is confirmed. At Step S85, the pair of the IP addresses of the device being focused on and the number of hops to the device being focused on are stored. At Step S86, it is judged whether the traceroute has been completed for all network devices, and until it is completed, the process returns to Step S81 and repeats the above-described processings while changing the device being focused on.

When the traceroute is completed for all network devices, the process advances to Step S87, and data stored for each network device at the Step S85 is sorted in descending order of the number of hops, and a restoration order is allotted. In other words, the order of restoration is determined so that the network device with a larger number of hops from the operation server 3 is restored earlier.

Figure 18:
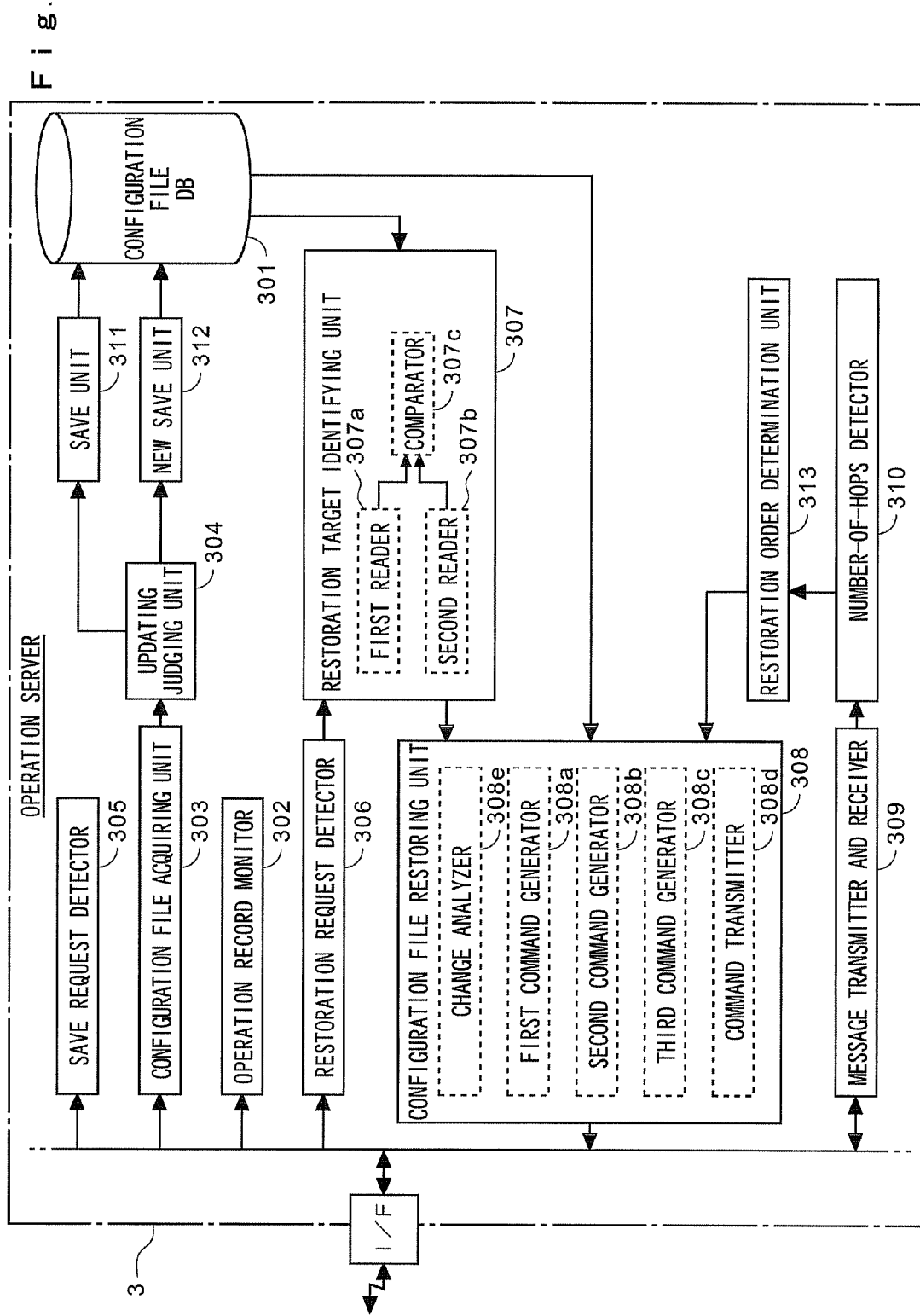
FIG. 18 is a functional block diagram of an operation server.

FIG. 18 is a functional block diagram showing a construction of an embodiment of the operation server 3, and herein, components unnecessary for description of the present invention are not shown.

A configuration file database 301 is a storage means in which a configuration file is linked to a first identifier IDs representing a save timing thereof and a second identifier IDrs representing a new save timing and saved. An operation record monitor 302 monitors operation records of the network devices, and selects a network device having an operation record at the Step S401.

A save request detector 305 detects a save request transmitted from the client 1 at the Step S1. A configuration file acquiring unit 303 acquires a configuration file from a network device that has an operation record after the previous save timing in response to the save request.

An updating judging unit 304 judges updating by comparing configuration files acquired from the respective network devices and registered configuration files linked to the first identifier IDs representing the previous save timing at Step S204. A new save unit 312 acquires an updated configuration file from a network device and links it to the first identifier IDs which sets the current timing as a save timing and a second identifier IDrs which sets the current timing as a new save timing and saves it in the configuration file database 301.

A save unit 311 copies a registered configuration file of a network device whose configuration file has not been updated and links it to the first identifier representing the current save timing and a second identifier linked to this configuration file and saves it in the configuration file database 301. A restoration request detector 306 detects a restoration request transmitted from the client 1 at Step S3. An object-to-be-restored identifying unit 307 identifies a network device to be restored in response to the restoration request including a restoration time at the Step S403. A configuration file restoring unit 308 reconfigures and restores a registered configuration file linked to a first identifier representing the restoration time in the network device to be restored.

The object-to-be-restored identifying unit 307 includes a first reader 307a which reads out a second identifier of a registered configuration file linked to a first identifier IDs representing the latest save timing, a second reader 307b which reads out a second identifier IDrs of a registered configuration file linked to a first identifier IDs representing the restoration time, and a comparator 307c which compares the read out second identifiers, and identifies a network device to be restored based on the comparison result.

The configuration file restoring unit 308 includes a change analyzer 308e which analyzes a changed item and contents of the change by comparing the registered configuration file linked to the first identifier representing the latest save timing and the registered configuration file linked to the first identifier representing the restoration time.

The configuration file restoring unit 308 further includes a first command generator 308a which generates a command for adding a deleted item whose content of change is "deletion" to the configuration file at the Step S73, a second command generator 308b which generates a command for deleting an added item whose content of change is "addition" from the configuration file at Step S74, a third command generator 308c which generates a command for deleting the changed item whose content of change is "change" from the configuration file and a command for adding the item before changing to the configuration file at Steps S75 and S76, respectively, and a command transmitter 308d which transmits the commands to the network device at Step S68 and makes it execute the commands.

A message transmitter and receiver 309 executes traceroute for investigating a route for the network devices (herein, routers or switches) in order at Step S82, and transmits an ICMP echo request message and receives ICMP Time Exceeded error messages. A number-of-hops detector 310 detects the number of hops to the network devices based on response messages sent back from the network devices at Steps S84 through S86. A restoration order determination unit 313 determines a restoration order of the network devices based on the number of hops to the network devices at Step S87. The object-to-be-restored identifying unit 307 restores the network configurations in an ascending order of the number of hops from this identifying unit, preferentially, based on the restoration order.

What is claimed is:

1. A network configuration restoration method in which configuration files of network devices are saved in an operation server in response to a save request and registered configuration files designated by a restoration request issued subsequently are reconfigured into the network devices to restore network configurations, wherein the operation server comprising a storage means which saves configuration file of the network device by linking it to a first identifier and a second identifier the first identifier represents a timing at which a configuration file is saved in the operation server in response to each save request, the second identifier represents an updating timing at which a configuration file identified as a configuration file saved in the operation server is newly saved in the operation server, and the network configuration server performing the steps of:
identifying a network device which has an operation record in response to a current save request;
acquiring a configuration file from the identified network device;
judging updating of each identified network device by comparing the acquired configuration file and a registered configuration file linked to a first identifier representing the latest save timing;
saving the configuration file acquired from the network device whose configuration file has been updated by linking it to a first identifier and a second identifier representing a current save timing; and
copying a registered configuration file linked to the first identifier representing the latest save timing of a network device whose configuration file has not been updated, and linking it to a first identifier representing a current save timing and a second identifier linked to the registered configuration file and saving it;
receiving a restoration request including a restoration timing;
identifying a network device which has an operation record in response to the restoration request;
acquiring a configuration file from the identified network device;
judging updating of each identified network device by comparing the acquired configuration file and a registered configuration file linked to a first identifier representing the latest save timing;
saving the configuration file acquired from the network device whose configuration file has been updated by linking it to a first identifier and a second identifier representing a current save timing;
copying a registered configuration file linked to a first identifier representing the latest save timing of a network device whose configuration file has not been updated, and saving it by linking it to a first identifier representing a current save timing and a second identifier linked to the registered configuration file;
reading out a second identifier of a registered configuration file linked to a first identifier representing the latest save timing;
reading out a second identifier of the registered configuration file linked to the first identifier representing the restoration timing;
identifying a network device to be restored based on the result of comparison between the second identifiers of each network device; and
reconfiguring the registered configuration file linked to the first identifier representing the restoration timing into the identified network device.

2. The network configuration restoration method according to claim 1, wherein
among the network devices, in a network device in which a configuration file stored in a nonvolatile storage region is copied into a volatile storage region and executed, when the network device starts,
the step of reconfiguring the registered configuration file includes the steps of:
comparing the registered configuration file linked to the first identifier representing the latest save timing and the registered configuration file linked to the first identifier representing the restoration timing, and analyzing changed items and the contents of the changes;
generating a command for adding a deleted item whose content of change is "deletion" to the configuration file in the volatile storage region;
generating a command for deleting an added item whose content of change is "addition" from the configuration file in the volatile storage region;
generating a command for deleting a changed item whose content of change is "change" from the configuration file in the volatile storage region, and a command for adding the item before changing to the configuration file in the volatile storage region;
transmitting the respective commands to the network device and making it execute the commands; and
instructing each network device to copy the configuration file restored in the volatile storage region into the nonvolatile storage region.

3. A network configuration restoration system which saves configuration files of network devices in an operation server in response to a save request and reconfigures registered configuration files designated by a restoration request issued subsequently into each network device to restore network configurations, wherein the operation server includes:

a storage means for saving a configuration file by linking it to a first identifier and a second identifier, where the first identifier represents a timing at which the configuration file is saved in the operation server in response to each save request, and the second identifier represents an update timing at which a configuration file identified as the configuration file saved in the operation server is newly saved in the operation server;

an operation record monitoring means for monitoring operation records of each network device;

a configuration file acquiring means for acquiring a configuration file in response to the save request from a network device which has an operation record after the latest save timing;

an updating judgment means for judging updating of each network device by comparing the acquired configuration file and a registered configuration file linked to a first identifier representing the latest save timing;

a new save means for saving the configuration file acquired from a network device whose configuration file has been updated by linking it to a first identifier and a second identifier representing a current saving timing;

a save means for copying a registered configuration file linked to a first identifier representing the latest save timing of a network device whose configuration file has not been updated and registering it into the storage means by linking it to a first identifier representing a current save timing and a second identifier linked to this configuration file;

an object-to-be-restored identifying means for identifying a network device to be restored in response to a restoration request including a restoration timing; and a configuration file restoring means for reconfiguring a registered configuration file linked to a first identifier representing the restoration timing into the network device to be restored, and the object-to-be-restored identifying means includes:

a first readout means for reading out a second identifier of a registered configuration file linked to a first identifier representing the latest save timing;

a second readout means for reading out a second identifier of a registered configuration file linked to the first identifier representing the restoration timing; and a comparing means for comparing second identifiers of the network devices with each other, and identifies a network device to be restored based on a comparison result.

4. The network configuration restoration system according to claim 3, wherein among the network devices, in a network device in which a configuration file that is stored in a nonvolatile storage region is copied into a volatile storage region and executed when the network device starts, the configuration file restoring means includes:

a change analyzing means for analyzing a change item and details of the change by comparing a registered configuration file linked to a first identifier representing the latest save timing and a registered configuration file linked to a first identifier representing a restoration timing;

a first command generating means for generating a command for adding a deleted item whose content of change is "deletion" to the configuration file in the volatile storage region;

a second command generating means for generating a command for deleting an added item whose content of change is "addition" from the configuration file in the volatile storage region;

a third command generating means for generating a command for deleting a changed item whose content of change is "change" from the configuration file in the volatile storage region and a command for adding the item before changing to the configuration file in the volatile storage region;

a command transmitting means for transmitting the commands to a corresponding network device and making it execute the commands; and a means for instructing each network device to copy a configuration file restored in the volatile storage region into the nonvolatile storage region.

* * * * *